March 22, 1955  H. W. KOCH  2,704,791
PUSH-PULL AMPLIFIER CIRCUIT
Filed April 29, 1949
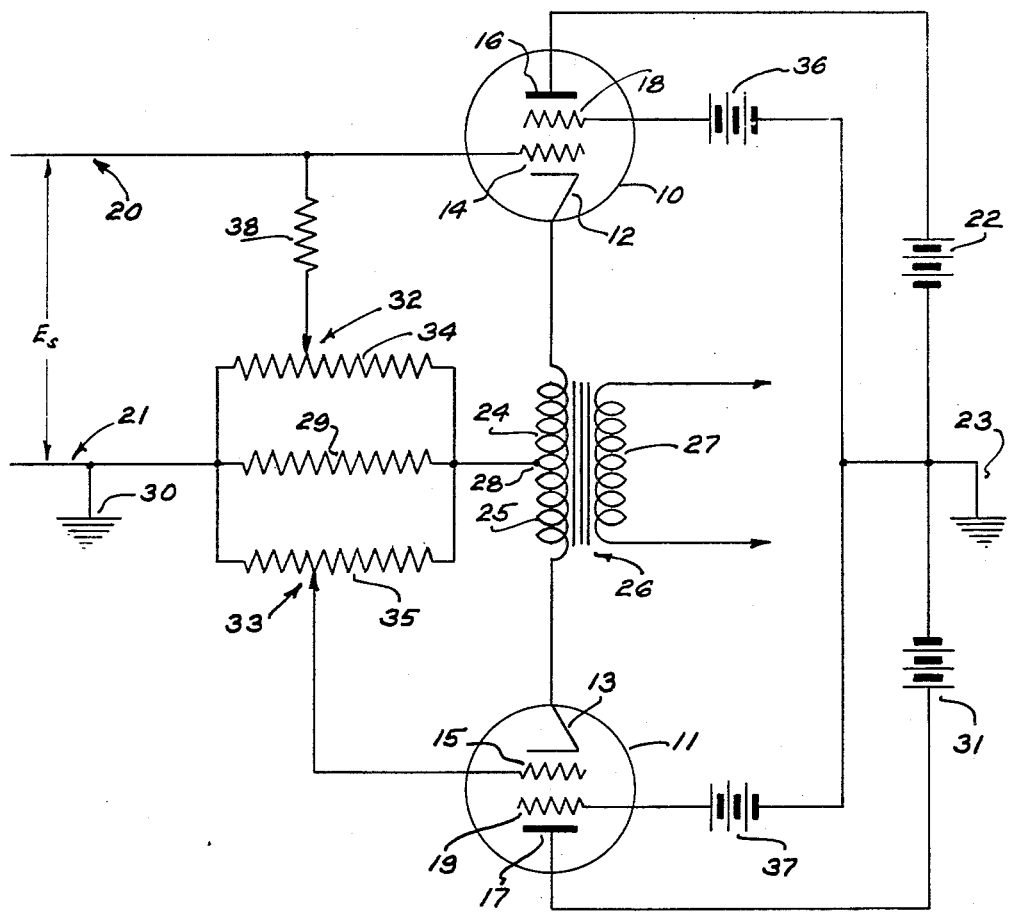
INVENTOR
H. W. KOCH
BY E. T. Kane
ATTORNEY United States Patent Office 2,704,791
Patented Mar. 22, 1955

2,704,791

PUSH-PULL AMPLIFIER CIRCUIT

Herbert W. Koch, Wheaton, Ill., assignor to Western Electric Company, Incorporated, New York, N. Y., a corporation of New York Application April 29, 1949, Serial No. 90,489

3 Claims. (Cl. 179—171)

This invention relates to an amplifier circuit and more particularly to a push-pull type amplifier.

As is well known in the art, all push-pull type amplifiers require voltages on their grids substantially 180° out of phase, and an object of this invention is to provide a new method of obtaining these out of phase voltages.

Another object of the invention is to provide an improved push-pull amplifier energized from an unbalanced source.

It is a further object of the invention to provide a push-pull amplifier circuit wherein the amplified output is produced across the secondary of a transformer, the primary of which is connected between the cathodes of the two amplifiers in the push-pull circuit.

In accordance with one embodiment of the invention a push-pull amplifier, which may be of the clas A type, is provided wherein the signal is applied to the control grid of one of a pair of tubes, the second tube being driven through its cathode from the cathode of the first tube by means of a tapped transformer winding in series with the cathode.

A complete understanding of the invention may be had by referring to the following detailed description taken in conjunction with the accompanying drawing wherein the single figure comprises a schematic circuit diagram illustrative of the invention.

Referring now to the drawing, the amplifier comprises a pair of electronic tubes 10 and 11 having cathodes 12 and 13, control grids 14 and 15, plate electrodes 16 and 17 and screen grids 18 and 19, respectively. An incoming signal to be amplified is connected to an input circuit 20, 21 where the signal is applied across a grid resistor 38 to the control grid 14 of the tube 10 to control the current flow in the plate circuit of the tube 10. The plate circuit of the tube 10 may be energized from any suitable direct current source such as a battery 22 which has its positive side connected to the plate electrode 16 and its negative side connected to ground at 23. The cathode 12 of the tube 10 is inductively coupled to the cathode 13 of the tube 11 through a pair of primary windings 24 and 25 of a transformer 26 which also has a secondary winding 27. The windings 24 and 25 are connected in series-aiding and are tapped at a point 28, which point is connected through a resistor 29 to ground at 30. The point 28 at which the two windings 24 and 25 are tapped is so selected that the two windings 24 and 25 are divided at their electrical rather than their physical or geometrical center. Thus, an increased current flow in winding 24 induces an opposite voltage in winding 25 and a consequent decrease in current flow in winding 25 results; however, the point 28 is so selected that the product of current times voltage in winding 24 is at all times substantially equal to the product of current times voltage in winding 25. Resistor 29 is placed in the circuit for the purpose of allowing the electrical center of the windings 24 and 25 to shift slightly about point 28 under varying conditions.

The plate circuit of the tube 11 may be energized by any suitable source of direct current, such as a battery 31 which has its positive terminal connected to the plate electrode 17 and its negative terminal connected to ground at 23.

Control grids 14 and 15 may be connected to movable contacts 32 and 33, respectively, on a pair of potentiometers 34 and 35, which may in turn be connected in parallel with resistor 29. Such an arrangement is often desirable and affords means for electrically balancing the two tubes 10 and 11 to compensate for slight manufacturing inaccuracies in the circuit elements. It is to be understood that it is entirely possible to operate the amplifier satisfactorily without the use of the potentiometers 34 and 35 in which case the grids 14 and 15 may be connected to ground at 30 through the resistor 29.

In order to have a more efficient amplifier it is desirable that screen grids 18 and 19 be provided and they may be energized from a separate well regulated direct current source such as batteries 36 and 37 which have their positive terminals connected to the screen grids 18 and 19, respectively, and their negative terminals connected to ground at 23. It has been found that the screen grid energization circuits operate equally well by connecting the negative terminals of the batteries 36 and 37 directly to the cathodes 12 and 13, respectively, rather than to ground, and it is further to be understood that the circuit will also operate satisfactorily by eliminating the screen grids altogether.

In the operation of the circuit assuming that the positive half of an alternating current signal is instantaneously impressed on the grid 14 of the tube 10, the cathode 12 at this time also tends to become more positive thus causing a greater current flow across the tube 10. This current flows through the winding 24 of the transformer 26 thus inducing a positive voltage on the cathode 13 which in turn tends to make the control grid 15 relatively more negative, thus reducing the current flow across the tube 11. It is thus obvious that the current flowing through the windings 24 and 25 induces a voltage across the secondary winding 27 which is the result of the summation of the currents flowing in windings 24 and 25 and is the output of the amplifier.

Assuming that an instantaneous negative signal is applied across the grid 14, current flow across the tube 10 is reduced, thus decreasing the current flow in the winding 24 which causes a negative voltage to be impressed on the cathode 13, thus causing the grid 15 to become relatively more positive causing a greater current flow across the tube 11. Thus the summation of currents flowing across tubes 10 and 11 will, as before, induce a voltage in the winding 27, which voltage is the output of the amplifier.

It is obvious, therefore, that the two tubes function as a push-pull amplifier although the incoming signal is only impressed on the grid of one of the tubes, and it will be seen that a positive signal on the grid of one tube causes the other tube grid to be driven relatively more negative and vice versa thus controlling the flow of current in the plate circuits of the two tubes in accordance with the incoming signal to produce an amplified output across the secondary winding 27.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An amplifier comprising a pair of electronic tubes each having an anode, a cathode and a control grid, means for applying a D. C. voltage between the anodes and ground, means for applying a signal directly to the control grid of one only of said tubes, a divided winding connecting the cathodes of said tubes, and a pair of resistances each having a tap, one end grounded and the other end connected to a point on said winding, each of said grids of said tubes being connected to said taps of said pair of resistances, respectively, whereby a signal potential applied to the control grid of said first tube will cause an opposite potential on the grid of said second tube thereby to cause said tubes to function as a push-pull amplifier.

2. An amplifier comprising a first electronic tube, a second electronic tube, each of said tubes having an anode, a cathode, a control grid and a screen grid, a transformer having a magnetizable core, a primary winding provided with a center tap and a secondary winding, means connecting one end of the primary winding to the cathode of one tube, means connecting the other end of the primary winding to the cathode of the other tube, means grounding the center tap of the primary winding, a source of signal voltage having one side connected to ground and the other side connected directly to the control grid of the first tube, adjustable resistance means connecting the control grid of the first tube to ground, adjustable resistance means connecting the control grid of the second tube to ground, means for impressing a predetermined D. C. potential across the screen grids and ground, and means for impressing a predetermined D. C. potential across the anodes and ground.

3. An amplifier comprising a first electronic tube, a second electronic tube, each of said tubes having an anode, a cathode, a control grid and a screen grid, a transformer having a magnetizable core, a primary winding provided with a center tap and a secondary winding, means connecting one end of the primary winding to the cathode of one tube, means connecting the other end of the primary winding to the cathode of the other tube, a resistor connected at one end to the center tap of the primary winding and at the other end to ground, a source of signal voltage having one side connected to ground and the other side connected directly to the control grid of the first tube, adjustable potential dividing resistance means connecting the control grid of the first tube to ground through a portion thereof and to the center tap of the primary winding through the remainder thereof, adjustable potential dividing resistance means connecting the control grid of the second tube to ground through a portion thereof and to the center tap of the primary winding through the remainder thereof, means for impressing a predetermined D. C. potential acoss the screen grids and ground, and means for impressing a predetermined D. C. potential across the anodes and ground.

References Cited in the file of this patent

UNITED STATES PATENTS

| | | |
|---|---|---|
| 1,924,469 | Strecker | Aug. 29, 1933 |
| 2,202,506 | Robin | May 28, 1940 |
| 2,240,635 | Avins | May 6, 1941 |
| 2,276,565 | Crosby | Mar. 17, 1942 |
| 2,460,907 | Schroeder | Feb. 8, 1949 |
| 2,477,074 | McIntosh | July 26, 1949 |
| 2,485,369 | Dome | Oct. 18, 1949 |
| 2,516,672 | Brochman | July 25, 1950 |

FOREIGN PATENTS

| | | |
|---|---|---|
| 791,120 | France | Sept. 23, 1935 |